H. L. F. TREBERT.
ICE CUTTING MACHINE.
APPLICATION FILED FEB. 28, 1917.

1,307,524.

Patented June 24, 1919.
2 SHEETS—SHEET 1.

WITNESSES:
Walter B. Payne

INVENTOR
Henry L. F. Trebert
BY
his ATTORNEYS

H. L. F. TREBERT.
ICE CUTTING MACHINE.
APPLICATION FILED FEB. 28, 1917.
1,307,524.
Patented June 24, 1919.
2 SHEETS—SHEET 2.
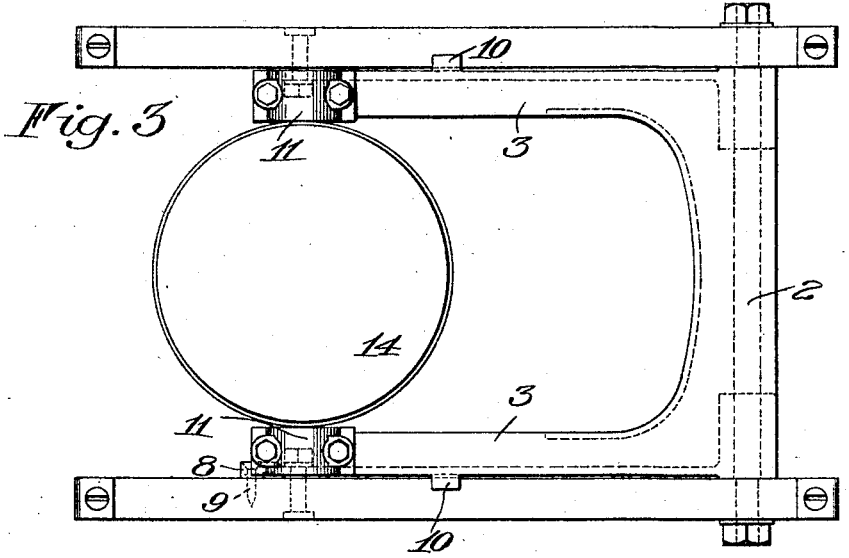
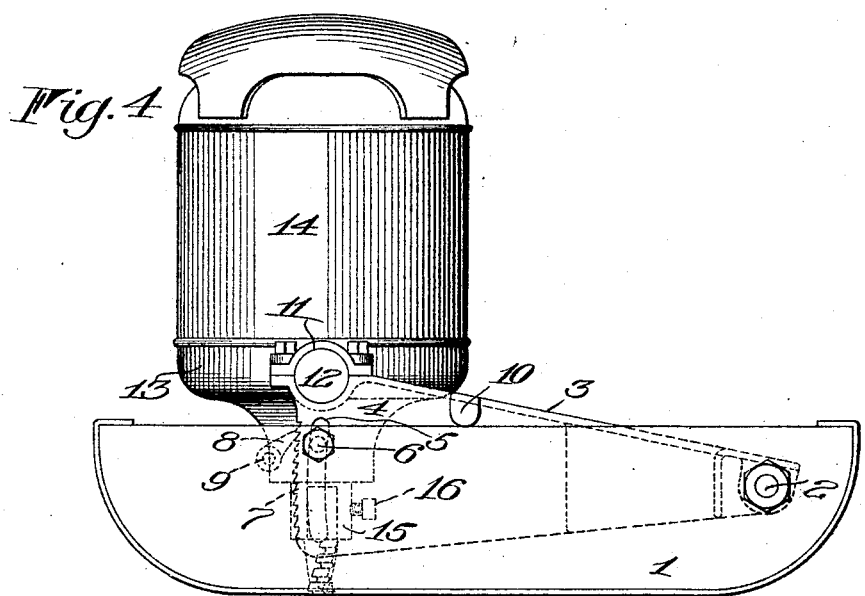
WITNESSES:
INVENTOR
Henry L. F. Trebert
BY
his ATTORNEYS

UNITED STATES PATENT OFFICE.

HENRY L. F. TREBERT, OF ROCHESTER, NEW YORK.

ICE-CUTTING MACHINE.

1,307,524.      Specification of Letters Patent.      Patented June 24, 1919.

Application filed February 28, 1917. Serial No. 151,403.

*To all whom it may concern:*

Be it known that I, HENRY L. F. TREBERT, of Rochester, in the county of Monroe and State of New York, have invented certain new and useful Improvements in Ice-Cutting Machines; and I do hereby declare the following to be a full, clear, and exact description of the same, reference being had to the accompanying drawings, forming a part of this specification, and to the reference-numerals marked thereon.

My present invention relates to ice cutting machines and it has for its object to provide a simple, small and compact device of this character that can be easily handled and will be suitable both for harvesting the ice in the first instance and for cutting around the blocks in the ice-house to free them after they have become frozen together during the period of storage. The improvements are directed in part toward providing means for regulating the depth of the cut and toward arrangements whereby the cutter may be carried close to the ice-house wall or other obstruction in the neighborhood of which the ice may lie. To these and other ends the invention resides in certain improvements and combinations of parts all as will be hereinafter more fully described, the novel features being pointed out in the claims at the end of the specification.

In the drawings:

Fig. 3 is an enlarged top plan view, and

Fig. 4 is an enlarged side elevation showing the opposite side of the machine from that represented in Figs. 1 and 2.

Similar reference numerals throughout the several views indicate the same parts.

Figure 1:
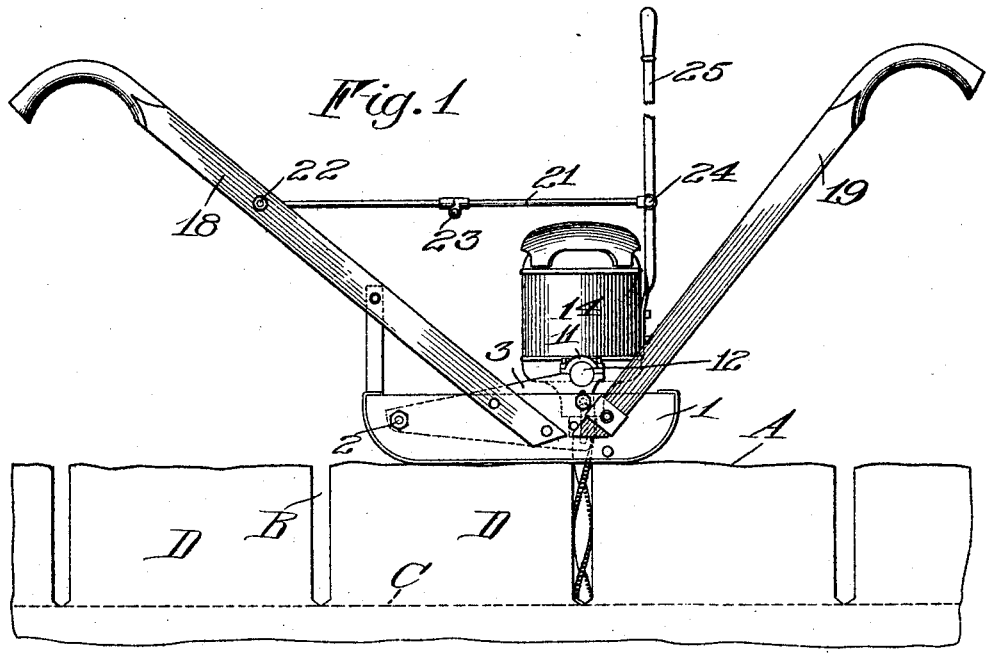
Figure 1 is a side elevation of an ice cutting machine constructed in accordance with and illustrating one embodiment of my invention, the same being shown in operative position with reference to a plurality of blocks of ice that have been separated by the machine.

In the present instance, I have shown a machine intended to be manually propelled and electrically driven though it is obvious that the carrier may be a horse drawn vehicle and other motive power may be used. It comprises a pair of sled runners 1 adapted to traverse the surface A of the ice and constituting a vehicle for moving the cutting mechanism about. These runners are connected at one end by a transverse shaft 2 on which is journaled a yoke-shaped frame 3 that is thereby permitted to swing up and down in a vertical plane. The opposite end of the frame of each side has a downwardly extending flange or bracket 4 slotted at 5 to receive a bolt 6 that extends through the adjacent runner. The slots 5 are arcuate and by means of the bolts the free end of the frame may be adjusted up and down and secured in these different positions. When so adjusted, the free end of the frame also operates to rigidly space the runners at this end of the vehicle in the same manner that the shaft 2 holds them at the other end. ratchet teeth 7 on the bracket or flange 4 at one side of the frame coöperate with a pawl 8 pivoted at 9 to the adjacent runner to preliminarily support the frame in adjusted position while the bolts 6 are being tightened. Lugs 10 on the sides of the frame 3 rest on the tops of the runners to limit the downward swing of the frame.

At the movable end of the frame are bearings 11 in which are supported trunnions 12 of a motor frame 13 carrying a motor 14 which motor is thus supported to swing in a vertical plane parallel with the runners. As before indicated, the motor in the present instance, is an electric motor that turns on a vertical shaft and connected to the lower end of this shaft as by a chuck 15 having a set screw 16 is a rotary ice cutting tool 17 that is disposed substantially vertically and extends downwardly below the surface plane of the vehicle, that is, the plane of contact between the runners 1 and the ice A. The nature of the cutter employed forms no part of this invention but it may preferably be in the form of a large twist drill with suitable teeth on its cutting periphery as shown.

Handles 18 and 19 extending longitudinally of the runners 1 and preferably corresponding to those on a plowshare are provided at each end of the vehicle so that it may be pushed or pulled by the operator from either end or may be worked by two men if desired.

Figure 2:
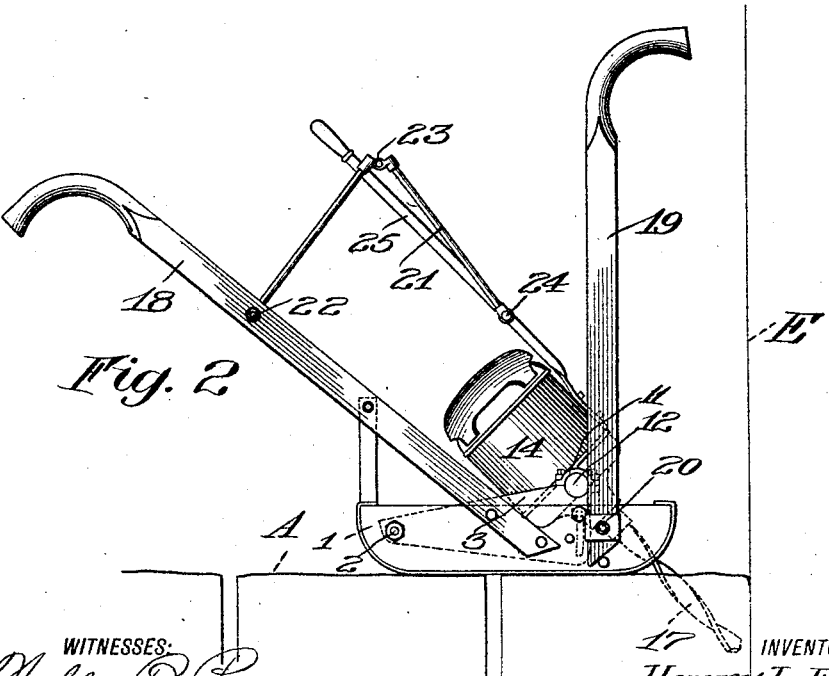
Fig. 2 is a similar view with the machine adjusted to another position for carrying a cut up close to an abutting wall.

In operation, the tool 17 is adjusted to the depth of cut desired by means of the movable frame 3 and then forced transversely through the ice by sliding the vehicle in any desired direction on the surface thereof to cut the kerfs shown at B in Figs. 1 and 2.

Assuming that the dotted line C in Fig. 1 represents the plane between superposed layers of ice cakes in an ice-house, it will be observed that the cutter may be adjusted to the proper depth to separate the blocks D in the upper layer without mutilating those beneath or the floor of the ice-house if the latter lies at C.

The motor 14 and tool 17 are preferably arranged nearer one end of the vehicle than the other and the handle 19 at this end I make a folding handle that, in the present instance, may be moved to the vertical position of Fig. 2 by virtue of a pivoted socket 20 on the vehicle in which it is held. This end of the vehicle may therefore be run up close to an obstruction such as the side wall E of the ice-house and the motor 14 tilted in its bearings 11 so as to cause the cutting tool 17 to project in an inclined position beyond the end of the vehicle and close to the wall. In this way, the cut may be carried close up to the obstruction.

The motor and cutter are normally maintained in their usual upright positions in the present instance, by a folding strut 21 pivoted to the fixed handle 18 at 22 and having an intermediate joint 23. At the other end the strut is pivoted at 24 to an upright handle 25 rigidly secured to the motor casing 14 so that by breaking the joint 23 the operator may reach over and, by manipulating the handle 25, direct the cutter as desired with reference to its swinging motion in a vertical plane.

I claim as my invention:

1. In an ice cutting machine, the combination with a vehicle adapted to traverse the ice, a cutter carried thereby near one end and projecting downwardly below the surface plane of the vehicle and means for driving the cutter, of a handle projecting from each end of the vehicle, that adjacent to the cutter being pivoted to swing into a position in which it does not project beyond the vehicle.

2. In an ice cutting machine, the combination with a vehicle adapted to traverse the ice, of a cutter carried thereby rotatable on a vertical axis and adapted to project downwardly below the surface plane of the vehicle and to swing in the plane of the direction of movement of the latter, to a position in which it projects beyond the forward end of the vehicle, a folding handle for the latter extending from said last mentioned end, means for driving the cutter and means for swinging the cutter and its driving means in the plane of the direction of movement of the vehicle to project the cutter beyond the end of the vehicle.

3. In an ice cutting machine, the combination with a vehicle, a cutter journaled in the vehicle and projecting downwardly therefrom, means for swinging the cutter to project the same beyond the end of the vehicle, a fixed handle projecting from one end of the vehicle and a pivoted handle projecting from the other end of the vehicle and adapted to swing to a vertical position when the cutter projects beyond the vehicle.

HENRY L. F. TREBERT.

Witnesses:
RUSSELL B. GRIFFITH,
AGNES NESBITT BISSELL.